United States Patent Office 3,113,160
Patented Dec. 3, 1963

3,113,160
PRODUCTION OF HIGH-PURITY VINYL ALKALI METAL COMPOUNDS
Donald J. Foster, South Charleston, and Erich Tobler, Charleston, W. Va., assignors to Union Carbide Corporation, a corporation of New York
No Drawing. Filed June 30, 1959, Ser. No. 823,814
5 Claims. (Cl. 260—665)

This invention relates to chemical processes. More particularly, it relates to a process for making vinyl alkali metal compounds of much greater purity than have heretofore been available.

It is known to make vinyl alkali metal compounds by reacting a vinyl halide with an alkali metal in an appropriate solvent to produce an equimolar mixture of the desired vinyl alkali metal compound and an alkali metal halide. Both products are almost totally insoluble in the reaction medium and have been found to be impossible to separate. The vinyl organometallic has therefore, of necessity, been used for further reaction in admixture with the alkali metal halide. While the presence of the inorganic halide is acceptable for some reactions, it is understandably quite undesirable for many others.

It has also been proposed to make vinylsodium from amylsodium, propylene and sodium isopropoxide (Morton, Journal of the American Chemical Society, volume 72, page 3785, 1950). In this method a salt is essential for the process and the insoluble vinylsodium is admixed with sodium chloride and insoluble sodium isopropoxide.

We have now discovered that salt-free vinyl alkali metal compounds of a high degree of purity can be prepared by the reaction of an alkali metal with the vinyl derivative of a metal which is more electronegative than the alkali metals. We prefer to use divinylmercury as a reagent and in a preferred embodiment of our invention the alkali metal, in a finely-divided form, is suspended in an aliphatic hydrocarbon and the divinylmercury, either alone or dissolved in a suitable solvent, is added dropwise to the reaction mixture at a rate sufficient to maintain the reaction. When the reaction is complete the dense liquid mercury is withdrawn from the bottom of the reaction vessel. Small traces of the alkali metal that might otherwise remain are amalgamated and removed with the mercury. The resulting high-purity finely-divided suspension of vinyl alkali metal in an aliphatic hydrocarbon can be used as such or can be filtered under an inert atmosphere such as nitrogen to give the high-purity product. The filter cake can then be washed with a dry aliphatic hydrocarbon solvent to remove any traces of divinylmercury.

The process of our invention can be represented by the equation:

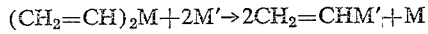

$(CH_2=CH)_2M + 2M' \rightarrow 2CH_2=CHM' + M$ wherein M' is an alkali metal such as lithium, sodium, potassium, rubidium or cessium and M is a metal more electronegative than M', such as mercury, bismuth, antimony, lead, cadmium, zinc, beryllium, aluminum, and the like.

Aliphatic hydrocarbons such as pentane, cyclopentane, hexane, heptane, iso-octane, cyclohexane, decahydronaphthalene, nonane, and the like, are preferred solvents as the reaction medium for the process of the invention. Aromatic hydrocarbons such as benzene, toluene, xylene, tetrahydronaphthalene, and the like, and ethers such as ethyl ether, propyl ether, butyl ether, tetrahydrofuran, tetrahydropyran, ethers derived from ethylene glycol and diethylene glycol, and the like, are also quite workable in the invention, with certain restrictions, however. The vinyl alkali metal compounds will react with aromatic hydrocarbons at higher temperatures, above about 60° C.

If an ether is the reaction medium solvent the temperature must be kept below about 0° C. to 10° C. in order to prevent reaction of the vinyl alkali metal.

The reaction temperature is not narrowly critical except as dictated by the solvent. Ambient temperatures are quite satisfactory with any of the alkali metals when an aliphatic or aromatic hydrocarbon solvent is employed. With the aliphatic hydrocarbons temperatures up to about 100° C. may be used if desired while with aromatic hydrocarbon solvents temperatures up to 60° C. can be used. With aliphatic or aromatic hydrocarbon solvents temperatures below about 0° C. are unnecessary and tend to reduce the reaction rate. With aliphatic ethers as solvents, however, temperatures of 0° C. to minus 25° C. are preferred. Atmospheric pressure is ordinarily used. The ratio of reactants can be varied widely without adverse effect. The stoichiometric quantity of reactants is the preferred ratio however. Too great an excess of alkali metal should be avoided as it could result in incomplete amalgamation of the excess metal and result in contamination of the product.

When the vinyl metal compound used in the process is divinylmercury the liquid mercury is readily separated from the product suspension by decantation or the like. When a non-liquid metal such as lead, bismuth or the like is used, the separation can be made by taking advantage of the difference in density between a relatively heavy metal such as lead, bismuth or the like and the relatively light alkali metal.

Example I

A total of 4.6 grams (0.2 gram atom) of sodium was dispersed in 100 milliliters of nonane and then 25.5 grams (0.01 mol) of divinylmercury dissolved in 50 milliliters of nonane were added dropwise at a temperature of 25° C. The reaction was exothermic and the addition rate was adjusted to maintain the reaction temperature between 25° C. and 35° C. At the completion of the reaction a fine suspension of vinylsodium was obtained. The reaction mixture also contained a pool of metallic mercury in the bottom of the reaction flask which was withdrawn and weighed. The yield of metallic mercury, 16.4 grams, was 82 percent of the theoretical. The suspension of vinylsodium was filtered under an inert atmosphere of dry nitrogen and the product was washed with dry pentane to remove any adhering divinylmercury. A portion of the vinylsodium was reacted with water and the gas evolved was collected and analyzed by means of a mass spectrometer. The product was essentially pure ethylene. Another portion of the vinylsodium was reacted with trimethylchlorosilane in pentane and the product, trimethylvinylsilane, compared chemically and spectroscopically with an authentic sample, proved to be identical.

Example II

Twenty milliliters of pentane, 5.1 grams (0.02 mol) of divinylmercury and 0.9 gram (0.04 gram atom) of soduim were sealed in a pyrex tube 250 millimeters long and 10 millimeters inside diameter under a nitrogen atmosphere and shaken for twenty-four hours at ambient temperature. The tube was then opened and the liquid mercury found therein was withdrawn. The recovery of 3.5 grams of mercury indicated an 88 percent conversion of the divinylmercury to vinylsodium. The suspension of black vinylsodium removed from the tube was filtered, washed with dry pentane and hydrolyzed. The gas evolved was collected and analyzed and found to be almost exclusively ethylene. Hydrogen and acetylene were not detected in this gas, indicating that the vinylsodium was not contaminated with sodium metal, sodium acetylide or sodium carbide.

Example III

A total of 1.4 grams (0.02 gram atom) of lithium was dispersed in 100 milliliters of mineral oil. The mineral oil was subsequently mixed with 100 milliliters of hexane and then 25.5 grams (0.01 mol) of divinylmercury dissolved in 50 milliliters of hexane were added dropwise at a temperature of 25° C. The reaction was exothermic and the addition rate was adjusted to maintain the reaction temperature between 25° C. and 35° C. At the completion of the reaction a fine suspension of vinyllithium was obtained. The suspension of vinyllithium was filtered under an inert atmosphere of nitrogen and the product was washed with dry pentane to remove any adhering divinylmercury. The vinyllithium was reacted with water and the gas evolved was collected, measured and analyzed with a mass spectrometer. The gas was essentially pure ethylene and the quantity evolved showed a yield of vinyllithium in the process of 73 percent of the theoretical.

Example IV

A total of 7.8 grams (0.2 gram atom) of potassium was dispersed in 100 milliliters of heptane and then 25.5 grams (0.01 mol) of divinylmercury dissolved in 50 milliliters of heptane were added dropwise at a temperature of 25° C. The reaction was exothermic and the addition rate was adjusted to maintain the reaction temperature between 25° C. and 35° C. At the completion of the reaction a fine suspension of vinylpotassium was obtained. The suspension of vinylpotassium was filtered under an inert atmosphere of nitrogen and the product was washed with dry pentane to remove any adhering divinylmercury. The vinylpotassium was reacted with water and the gas evolved was collected, measured and analyzed with a mass spectrometer. The gas was essentially pure ethylene and the quantity evolved showed a yield of vinylpotassium in the process of 68 percent of the theoretical.

What is claimed is:

1. Process for obtaining vinyl alkali metal compounds in high purity which comprises adding divinylmercury to a suspension of a finely-divided alkali metal in a reaction medium selected from the group consisting of hydrocarbons and organic ethers, at a reaction temperature of from 0° C. to 100° C.

2. Process according to claim 1 wherein said alkali metal is suspended in an aliphatic hydrocarbon.

3. Process for obtaining high-purity vinyllithium which comprises adding divinylmercury to a suspension of finely-divided lithium in a reaction medium selected from the group consisting of hydrocarbons and organic ethers, at a reaction temperature of from 0° C. to 100° C.

4. Process for obtaining high-purity vinylsodium which comprises adding divinylmercury to a suspension of finely-divided sodium in a reaction medium selected from the group consisting of hydrocarbons and organic ethers, at a reaction temperature of from 0° C. to 100° C.

5. Process for obtaining high-purity vinylpotassium which comprises adding divinylmercury to a suspension of finely-divided potassium in a reaction medium selected from the group consisting of hydrocarbons and organic ethers, at a reaction temperature of from 0° C. to 100° C.

References Cited in the file of this patent

UNITED STATES PATENTS 2,873,287   Ramsden _____ Feb. 10, 1959

OTHER REFERENCES

Bartocha et al.: Naturforche., 14b, 809 (1959).

Coates: "Organo-Metallic Compounds," 11 pages (1956), page 3, 4, 11, 15 and 16, published by John Wiley & Sons, Inc., New York, N.Y.

Jones et al.: Chem. Reviews, volume 54, No. 5, 10/54, pages 841 to 845.

Morton et al.: Jour. Am. Chem. Soc., 72, No. 8, pages 3785 to 3792 (1958).

Nesmeyanor et al.: Izvest Akael. Nauk S.S.S.R., Otdel Khim Nauk, 1490–1 (1958), Chemical Abstracts 53, 7973 (1959).

"Organo-Metallic Compounds of the First Three Periodic Group," G. E. Coates, Quarterly Reviews, volume IV, No. 3, 1950, page 218.

Rochow et al.: "The Chemistry of Organo Metallic Compounds," Wiley & Sons, New York (1957), pages 48–49.

"The Chemistry of the Organo-Metallic Compounds" (1957), published by John Wiley & Sons, Inc., New York, page 43.